United States Patent [19]
van der Weide et al.

[11] Patent Number: 5,748,309
[45] Date of Patent: May 5, 1998

[54] COHERENT PERIODICALLY PULSED RADIATION SPECTROMETER

[75] Inventors: D. W. van der Weide, Newark, Del.; Fritz Keilmann, Martinsried, Germany

[73] Assignee: Max-Planck-Gesellschaft zur Forderung der Wissenschaften, Germany

[21] Appl. No.: 545,136

[22] Filed: Oct. 19, 1995

[30] Foreign Application Priority Data

Oct. 20, 1994 [DE] Germany ............... 44 37 575.1

[51] Int. Cl.$^6$ ............................................. G01J 3/28
[52] U.S. Cl. ............................................. 356/326
[58] Field of Search ........................ 356/318, 326, 356/349, 344, 346, 328; 250/458.1, 459.1, 461.1, 461.2, 338.5

[56] References Cited

U.S. PATENT DOCUMENTS 5,293,213 3/1994 Klein et al. ............... 356/318

OTHER PUBLICATIONS

Bostak et al, All–Electronic Generation of Sub–Picosecond Shock Waves and Their Application to a Terahertz Spectroscopy System; OSA Topical Meeting on Ultra Fast Electronics and Optoelectronics, San Francisco Jan. 23–25, 1993 pp. 1–4.

Grischkowsky et al, "Far Infrared . . . Semiconductors," J. Opt. Soc. Am. B/vol. 7, No. 10 Oct. 1990 pp. 2006–2015.

*Primary Examiner*—K. Hantis
*Attorney, Agent, or Firm*—Iandiorio & Teska

[57] ABSTRACT

A spectroscopy method is defined in which a first source of radiation (51) emits a periodically pulsed beam (A) having a repetition frequency $\omega$ and in that a second source of radiation (52) emits a periodically pulsed beam (B) having a repetition frequency $\omega+\Delta$, the beams are united with each other and directed at a material specimen (6) to be analyzed and a detector means determines the amplitudes of the frequency components $n\Delta$ of the beam emanating from the material specimen.

15 Claims, 1 Drawing Sheet

5,748,309

COHERENT PERIODICALLY PULSED RADIATION SPECTROMETER

FIELD OF THE INVENTION

The invention relates to a spectroscopy method employing coherent periodically pulsed radiation for determining spectroscopic properties of a specimen using coherent periodically pulsed radiation and a device which implements said method.

DESCRIPTION OF THE RELATED ART

Usually, spectrometers operate with electromagnetic radiation in a prescribed frequency range, which in CW, i.e. as a sinusoidal waveform is directed at a material specimen to be analyzed and include means for detecting the signal amplitude of the radiation transmitted or reflected by the material specimen and indicating the same. More recently, however, spectrometers have been developed which operate on the basis of electromagnetic pulses having a defined repetition frequency $\omega$. In this spectrometer concept the frequency range available as a result of the non-sinusoidal time dependency of the electromagnetic radiation consists of components which substantially correspond to whole number multiples of the repetition frequency $\omega$. The envelope of this "frequency comb" results from a Fourier transform of a single electromagnetic pulse. The temporal shortness of the individual pulses thus determines substantially the available frequency bandwidth. Thus in theory, by tuning the repetition frequency $\omega$ accordingly any desired frequency component may be produced in the available frequency range.

As examples of such a spectrometer concept, reference is made to the publications of Grischkowsky et al. (Journal of the Optical Society of America Vol. 7, 2006–2015 (1990) and Bostak et al. (OSA Topical Meeting on Ultrafast Electronics and Optoelectronics, San Franciso, Jan. 23–25, 1993).

In the work of Grischkowsky et al, a flow of current of extremely short duration is achieved through a high-defect, circuitry-structured semiconductor by irradiating it with femtosecond laser pulses, resulting in a short electromagnetic pulse being radiated into the free space above the specimen. The drawback in this configuration is the size and expensiveness of the laser beam source. In addition, the pulse repetition frequency $\omega$ is not selectably adjustable.

By contrast, the device by Bostak et al. is substantially compacter, since it does away with the need of a femtosecond laser. Instead, it makes use of non-linear electric conducting paths by which electric pulses are shortened and radiated into free-space via suitable antenna structures.

However, both concepts suffer from the additional disadvantage that the detector means are configured just as complicated as the emitter means. The reason for this is that detecting the ultrafast electromagnetic transients—the generation of which already necessitates complicated, non-conventional techniques—employed for the spectroscopy also fails to be possible by conventional detector el ectronics. In practice this means that for the spectrometer of Grischkowsky et al. an ultrafast conductivity transient needs to be generated at the detector end, and that for the spectrometer of Bostak et al. non-linear circuitry triggered by a signal source needs to be provided at the detector end. The time profile of the electromagnetic pulse transmitted by the material specimen needs to be established by an autocorrelation technique, so that the spectrum can then be computed by a Fourier Transform of this time function.

Accordingly, the drawback of particularly the spectrometer of Bostak et al is that two separate non-linear circuits need to be arranged in the emitter device and in the detector devices. Such an arrangement is relatively lacking in flexibility and only permits adjustment to changes in the conditions of the experiment or geometry of the specimen with difficulty. A further drawback of conventional spectrometers according to FIG. 2 is that certain response functions of the material specimen such as e.g. the conductivity cannot be measured. Furthermore, although the inherent phase sensitivity of spectrometers of the kind concerned is important for many applications, this is, however, not desired e.g. in gas analyses and may even be a disadvantage in the case of dispersion or beam fluctuations in the sensing beam passing through the material specimen being analyzed.

SUMMARY OF THE INVENTION

The object of the present invention is thus to extend the range of application of a spectrometer of the kind concerned.

The spectrometer according to the invention makes use of two signal sources at the emitter end, both of which emit electromagnetic coherent radiation in the form of pulses having an adjustable repetition frequency, the temporal pulse length being small against the pulse period. The repetition frequencies of the electromagnetic beams emitted by the signal sources are $\omega$ and $\omega+\Delta$ and thus differ from each other by a frequency increment $\Delta$ which is small, compared to the frequency $\omega$. The material specimen to be analyzed is transmittingly irradiated by the two beams. In a detector means the beams are caused to be superimposed, this device having the advantage that the detector device is simple to configure, it consisting, for instance, of merely one detector sensitive to the radiation in the frequency range concerned. This permits experimental layouts which were hitherto impossible in the spectrometer concepts defined by prior art.

BRIEF DESCRIPTION OF THE DRAWING

The invention will now be explained in the following on the basis of preferred example embodiments in conjunction with the Figures, in which.

DESCRIPTION OF THE PREFERRED EMBODIMENTS

Figure 2:
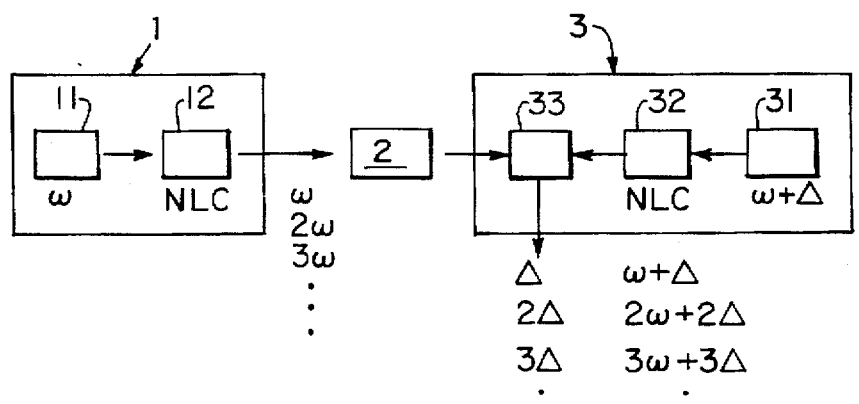
FIG. 2 is a schematic representation of a prior art spectrometer.

FIG. 2 is a schematic representation of a prior art spectrometer, as specified e.g. by Bostak et al. An emitter means 1 comprises a signal generator 11 which supplies an approximately sinusoidal voltage signal of a frequency $\omega$, e.g. in the GHz range, to a non-linear circuit (NLC) 12, by means of which the edges of the sinusoidal signal are steepened. In the frequency picture this means that due to the NLC a comb-like structure of frequencies is generated, corresponding to whole number multiples of the frequency $\omega$ within an envelope curve. The bandwidth of the envelope curve, i.e. its decline at the high-frequency end is dictated by the temporal length of the edges of the signals shortened by the NLC. The spectrum of a material specimen 2 is then analyzed by the radiation thus produced. A detector device 3 is configured principally similar to the emitter means 1, it thus comprising also a signal generator 31 generating an approximately sinusoidal voltage signal of a frequency ω+Δ, and a non-linear circuit (NLC) 32 by means of which electromagnetic radiation having the frequency components ω+Δ, 2 ω+2 Δ, ... is generated. To sense the pulses transmitted by the material specimen 3, the former are superimposed in a sampler 33 with the radiation generated in the NLC 32. The complex amplitude of the output signal of the sampler 33 at the frequency nΔ has a linear relationship to the complex amplitude of the electromagnetic wave being transmitted at the frequency nΔ. In just the same way, instead of generating a signal having the frequency ω+Δ a signal having the frequency ω may be employed, the phasing of which is periodically shifted by a phase shifter operating at the frequency Δ. Having the same significance as the latter are the autocorrelation techniques, as employed e.g. by Grischkowsky et al.

Figure 1:
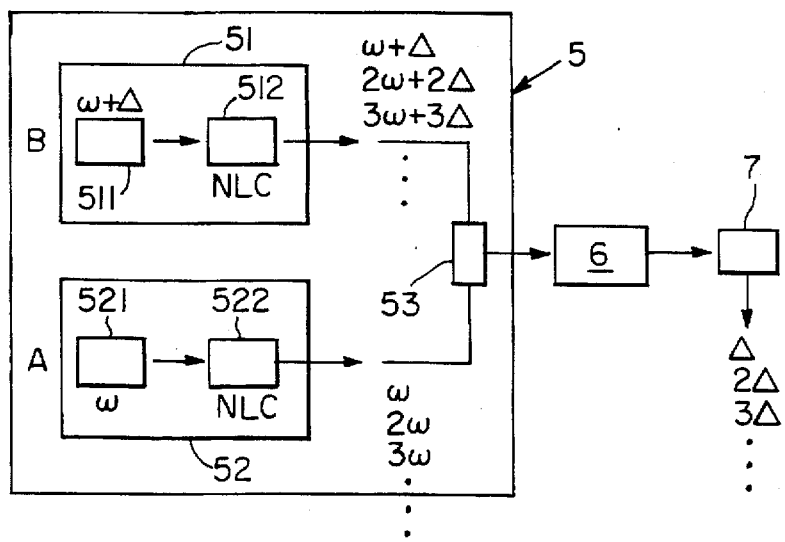
FIG. 1 is a schematic representation of one embodiment of a spectrometer according to the invention.

FIG. 1 is a schematic representation of one embodiment of the invention, comprising an emitter means 5, the material specimen 6 to be analyzed and a detector 7. The emitter means 5 comprises in turn two signal sources 51 and 52 which may be of identical configuration, each of which including a signal generator 511 and 521 respectively and supplying a non-linear circuit (NLC) 512 and 522 respectively with an approximately sinusoidal voltage signal, e.g. in the GHz range. These signal generators 511 and 521 operate at frequencies ω and ω+Δ respectively, Δ being small with respect to ω. Due to the NLCs frequencies ω+Δ, 2ω+2Δ, ... and ω, 2ω ... respectively are generated. Subsequently, both signals may be united with each other in a combiner 53 to form a common trace. The radiation may then be radiated into space e.g. by an antenna. In the case of a transmission analysis, as illustrated, the radiation passing through the material specimen 6 is sensed. Instead of a transmission analysis, a reflection analysis may be undertaken, however.

In accordance with the invention the detector 7 includes no coherent source of radiation like such prior art devices as e.g. Bostak et al., and is thus configured considerably simpler. In the detector 7 the only measurement that takes place is that of the intensity of the frequency components Δ, 2Δ, ... resulting from mixing the two signals. The amplitude sensed has at the frequency nΔ a linear relationship to the geometric mean of the radiation amplitudes transmitted through the material specimen at the frequencies nω and n(ω+Δ).

The detector 7 may be e.g. a bolometer, the response of which needs to be at least high enough so that the detector 7 is able to follow the highest frequency nΔ. A spectrum analyzer for analyzing the frequency spectrum may for instance be connected to the detector 7.

The two coherent component waves A and B stemming from the signal sources 51 and 52 are required to interfere with each other, this being the reason why they should have a coherence relationship to each other which is as good as possible. This can be achieved by uniting the two component waves into a common trace upstream of the material specimen 6. This has the result that the probability of phase losses between the two signals due to dispersion or fluctuations of the beam in passing through the material specimen is substantially reduced. Losses in phase of this kind thus remain evident merely as interferences or disturbances in the phase of the beam as a whole. In such cases in which changes in phase are not to be expected in the material specimen, a separated beam guidance of the component waves A and B through the material specimen may also be provided, however, as long as there is sufficient assurance that the two component waves A and B are still in a sufficiently coherent relationship to each other even after having passed through the material specimen. Uniting the component waves may then be arranged to take place downstream of the material specimen or even on the detector.

Figure 3:
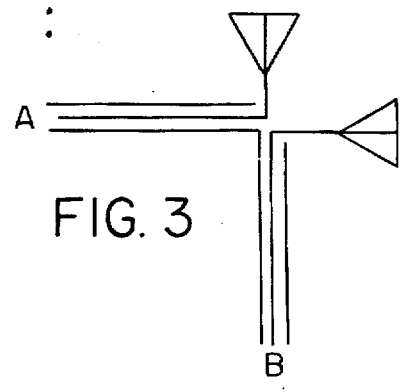
FIG. 3 depicts a dual antenna.

As illustrated in FIG. 1, the device may be configured compact to such an extent that both signal sources 51 and 52 are arranged on a common substrate. However, the direct vicinity of both signal sources to each other could possible result in stray coupling between the two signal sources. This would be a disadvantage, since mixed frequencies could develop which could hamper detecting the frequencies nΔ at the detector 7. To eliminate such stray coupling between the two signal sources A and B as best possible, a dual antenna orthogonally polarized on each other for the componentbeams A and B may be employed for the emitted radiation as shown schematically in FIG. 3. Following uniting of the two componentbeams a linear polarizer (not shown) may then be inserted in the common trace, the polarisation of which is adjusted such that it allows both component waves to pass in part.

Figure 4:
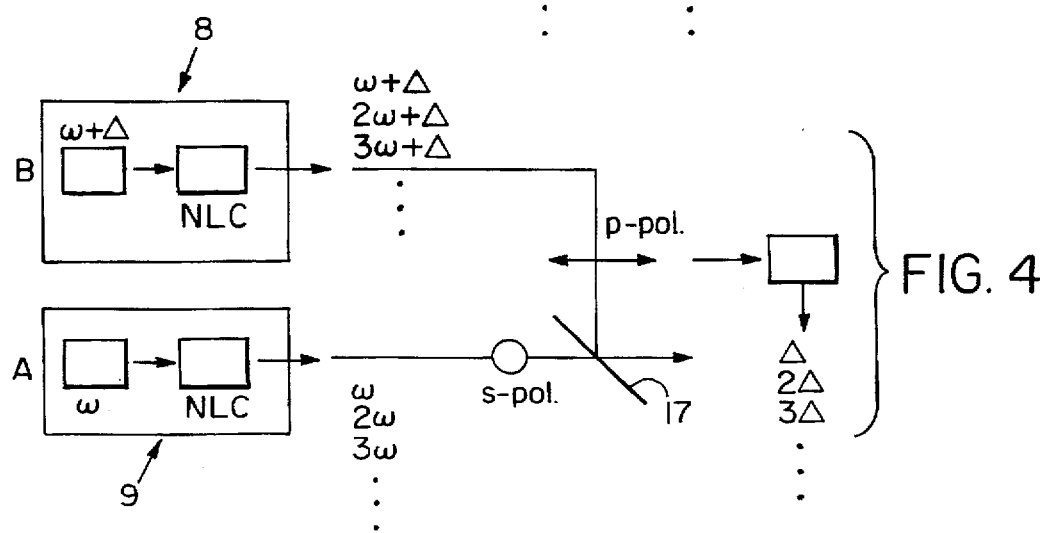
FIG. 4 is a schematic representation of a further embodiment of a spectrometer according to the invention.

However, to totally eliminate stray coupling, the embodiment as shown in FIG. 4 may also be used, albeit without being quite so compact, in which two emitter units 8 and 9 are employed separated from each other sufficiently in space, the output radiations of which are orthogonally polarized to each other. The two componentbeams are brought together by a polarizing beam splitter 17, resulting in the beam as a whole passing through a linear polarizer (not shown), the polarisation of which is set so that each of the two component waves is transmitted in part.

The invention has the great advantage that the detector is configured very simply, resulting in the range of application of such spectrometers being substantially extended. By means of the spectrometer according to the invention conductivity measurements may be implemented, for example. Also, experiments may be carried out in which the material specimen is arranged at a great distance away, e.g. in a mixing cryostat for sub-kelvin temperatures. On top of this, instead of a single detector, a plurality of detectors may be operated in parallel, thus making simultaneous analyses of e.g. a plurality of gas absorption lines or different materials possible.

For many applications it is good practice to include a visible laserbeam in the trace, to render the trace visible and thus facilitate adjusting the arrangement. This adjustmentbeam may additionally be modulated with a frequency Δ so that it may also serve as a reference in frequency analysis of the output signal. Yet a further aspect of this reference is the possibility of correcting the phase jitter of the emitter means, in which the variation of Δ with time is recorded and the analysis data suitably corrected.

The range of application of the concept according to the invention of combining two signal sources in a single emitter means may be further extended considerably by upconversion. For this purpose the output radiation of the emitter means is first supplied together with a highfrequency wave of frequency Ω>>N(ω+Δ) to an upconversion device. Should the upconversion device be conceived such that it generates only output waves having the frequency components Ω+n ω and Ω+n (ω+Δ), but supressing the frequency components Ω−n ω, Ω−n (ω+Δ) and n ω, the detector output signal senses at the frequency n Δ the spectral information at the input frequency Ω+n ω). Thus, the frequency ω may be in the microwave range, e.g. at 1 GHz and the frequency Ω30 THz (output frequency of the $CO_2$ laser). At N=100 the coherent spectrometer would thus be capable of generating 100 equidistant frequency components in a range 30.0 thru 30.1 THz and of making use of these for spectroscopy of a material specimen.

It is understood that although the invention is described only for electromagnetic radiation, it is also applicable e.g. for acoustic radiation. In upconversion the radiation must not necessarily be of the same type at the frequencies $\omega$ and $\Omega$, i.e. the radiation at the frequency $\Omega$ may be electromagnetic, whilst at the frequency $\omega$ it may be acoustic.

What is claimed is:

1. A spectroscopy method for determining spectroscopic properties of a specimen (6) said method using coherent periodically pulsed radiation, comprising the steps of:
    emission of a periodically pulsed beam (A) with a repetition frequency $\omega$ by a first source of radiation (51);
    emission of a periodically pulsed beam (B) having a repetition frequency $\omega+\Delta$ by a second source of radiation (52), wherein a component $\Delta$ is smaller than $\omega$, said periodically pulsed radiation being formed from said beams (A,B);
    wherein each pulse of said pulsed beams (A) and (B) being formed by components $\omega, 2\omega, 3\omega, \ldots$ and $(\omega+\Delta), 2(\omega+\Delta), 3(\omega+\Delta), \ldots$, which are higher multiples of the repetition frequencies, respectively;
    combination of said pulsed beams (A) and (B) into a common time-coherent beam and simultaneous irradiation of said specimen (6) by said common time-coherent beam; and
    simultaneous detection of radiation being transmitted or reflected by said specimen (6) due to said irradiation to a detector means (7) in which amplitudes of frequency components $\Delta, 2\Delta, \ldots, n\Delta$ are determined, which amplitudes allow the determination of said spectroscopic properties at frequencies corresponding to $\omega+\Delta, 2(\omega+\Delta), \ldots, n(\omega+\Delta)$.

2. The spectroscopy method as set forth in claim 1, wherein said beams (A, B) are emitted by said first and second sources of radiation (51, 52) perpendicularly polarized on each other.

3. The spectroscopy method as set forth in claim 1, wherein said first and second sources of radiation (51, 52) are arranged spatially separated from each other.

4. The method as set forth in claim 1, wherein said periodically pulsed radiation is formed from said beams (A, B) by the further steps of combination of said beams (A, B) with each other and application thereof together with a further beam, the frequency $\Omega$ of which being greater than the highest frequency component contained in said beams (A, B), to an upconversion means an output radiation of which forming said periodically pulsed radiation.

5. The method as set forth in claim 4, wherein said output radiation contains frequency components $\Omega+n\omega$ and $\Omega+n(\omega+\Delta)$ and wherein the frequency components $\Omega-n\omega, \Omega-n(\omega+\Delta)$ and $n\omega$ are suppressed by said upconversion means, wherein $n=1, 2 \ldots$.

6. The method as set forth in claim 1, wherein a visible laser beam is added to a trace of said periodically pulsed radiation and said radiation being transmitted or reflected.

7. The method as set forth in claim 6, characterized in that said visible laser beam is modulated with said component $\Delta$ and is used as a reference in frequency analysis of an output signal of said detector device.

8. The method as set forth in claim 7, characterized in that the time-dependent variations of $\Delta$ are recorded and frequency analysis data are corrected accordingly.

9. A spectrometer for determining spectroscopic properties of a specimen (6) said spectrometer providing time-coherent periodically pulsed radiation, comprising:
    a first source of radiation (51) for emitting a periodically pulsed beam (A) with a repetition frequency $\omega$;
    a second source of radiation (52) for emitting a periodically pulsed beam (B) with a repetition frequency $\omega+\Delta$, wherein a component $\Delta$ is smaller than $\Delta$;
    wherein each pulse of said pulsed beams (A) and (B) comprising components $\omega, 2\omega, 3\omega, \ldots$ and $(\omega+\Delta), 2(\omega+\Delta), 3(\omega+\Delta), \ldots$, which are higher multiples of the repetition frequencies, respectively;
    means (53) for combining said pulsed beams (A) and (B) into a common time-coherent beam of said periodically pulsed radiation; so as to provide simultaneous irradiation of said periodically pulsed radiation to said specimen (6); and
    detector means (7) for detecting radiation being transmitted or reflected by said specimen (6) due to said irradiation in which said detector means (7) amplitudes of frequency components $\Delta, 2\Delta, \ldots, n\Delta$ are determined, which amplitudes allow the determination of said spectroscopic properties at frequencies corresponding to $\omega+\Delta, 2(\omega+\Delta), \ldots, n(\omega+\Delta)$.

10. The spectrometer as set forth in claim 9, wherein said first and second sources of radiation (51, 52) each include a signal generator (511, 521) and a non-linear circuit (NLC) (512, 522) coupled thereto.

11. The spectrometer as set forth in claim 9, wherein said detector means (7) includes a bolometer.

12. The spectrometer as set forth in claim 9, wherein said means for combining comprises a combiner (53) which is disposed in a radiation path between said first and second sources of radiation (51, 52) and said specimen (6).

13. The spectrometer as set forth in claim 12, wherein said means for combining comprises a dual antenna.

14. The spectrometer as set forth in claim 12, wherein said means for combining further comprises an upconversion means being adapted to receive said beams (A, B) and a beam with a frequency $\Omega$ from a further source of radiation.

15. The spectrometer as set forth in claim 9, wherein a combiner is disposed in a trace between said specimen (6) and said detector means (7).

* * * * *